United States Patent [19]

Hirano et al.

[11] Patent Number: 4,590,034

[45] Date of Patent: May 20, 1986

[54] METHOD FOR PREPARING SINTERED BODY CONTAINING CUBIC BORON NITRIDE AND METHOD FOR PREPARING CUBIC BORON NITRIDE

[75] Inventors: Shin-ichi Hirano; Shigeharu Naka, both of Nagoya, Japan

[73] Assignee: Toshiba Tungaloy Co., Ltd., Kawasaki, Japan

[21] Appl. No.: 714,497

[22] Filed: Mar. 21, 1985

[30] Foreign Application Priority Data

Mar. 22, 1984 [JP] Japan .................................. 59-54656

[51] Int. Cl.$^4$ .............................................. B22F 5/00
[52] U.S. Cl. ........................................ 419/13; 75/238; 75/244; 419/14; 419/15; 419/17; 419/18; 419/26; 419/27; 419/29; 423/290; 423/298; 501/96
[58] Field of Search .................. 419/13, 15, 17, 14, 419/18, 26, 27, 29; 75/238, 244; 423/290, 298; 501/96

[56] References Cited

U.S. PATENT DOCUMENTS

| | | | |
|---|---|---|---|
| 4,138,252 | 2/1979 | Vereschagin | 419/13 |
| 4,394,170 | 7/1983 | Sawaoka et al. | 75/244 |
| 4,518,659 | 5/1985 | Gigl et al. | 419/13 |

Primary Examiner—Stephen J. Lechert, Jr.
Attorney, Agent, or Firm—Schwartz, Jeffery, Schwaab, Mack, Blumenthal & Evans

[57] ABSTRACT

Disclosed is a method for preparing a sintered body containing cubic boron nitride which comprise the steps of contacting a starting material containing boron nitride and/or a starting material containing at least one selected from the group consisting of metals of groups IVa, Va and VIa of the periodic table, silicon, aluminum, iron group metals and compounds of the aforesaid metals with at least one selected from the group consisting of borazine, a borazine derivative and a compound composed of boron, nitrogen and hydrogen as will release hydrogen by a thermal decomposition under pressure to form boron nitride; and sintering the material under conditions of a predetermined pressure and temperature under which cubic boron nitride is kept stable. Also disclosed is a method for preparing cubic boron nitride which comprises, in addition to the above steps, recovering cubic boron nitride from the obtained sintered body by a chemical and/or physical manner.

10 Claims, 2 Drawing Figures

METHOD FOR PREPARING SINTERED BODY CONTAINING CUBIC BORON NITRIDE AND METHOD FOR PREPARING CUBIC BORON NITRIDE

BACKGROUND OF THE INVENTION

This invention relates to a method for preparing a sintered body containing cubic boron nitride and a method for preparing a cubic boron nitride, more particularly to a method for preparing a cubic boron nitride-containing sintered body which contains at least cubic boron nitride as one of its constitutional components and a method for preparing cubic boron nitride under high-pressure and high-temperature conditions.

With regard to methods for preparing the cubic boron nitride sintered body, there have been made many suggestions, and these methods can roughly be classified into two manners. One of them comprises first synthesizing cubic boron nitride (hereinafter referred to as c-BN) at a high pressure and temperature, mixing the synthesized c-BN with a metal and/or compound which will serve as a binder, and preparing a sintered body from the resulting mixture at a high pressure and high-temperature again; and another of the above two manners comprises mixing boron nitride (hereinafter referred generically to as BN) such as amorphous boron nitride (hereinafter referred to as a-BN) or hexagonal boron nirtride (hereinafter referred to as h-BN), which is a starting material, with a metal and/or compound which will serve as a binder, and converting said BN into c-BN at a high pressure and high temperature and simultaneously forming a desired sintered body.

When both the manners mentioned above are compared, economically, the latter seems more preferable because of employing the only one high pressure and temperature process, though the former requires this high-cost process twice. In fact, however, the former has been utilized more prevalently in industrial fields. This reason is that in the case of the latter, the conversion of BN into c-BN will scarcely be carried out at 100% and the remaining BN will noticeably impair properties and performances of the prepared sintered body.

For the purpose of improving the conversion of BN into c-BN, methods in which catalysts are employed have been suggested. For example, there are known a method comprising first adding Co as a catalyst to h-BN as a starting material, and converting this h-BN into c-BN through a high-pressure and high-temperature reaction and simultaneously sintering it, as disclosed in Japanese Patent Publication No. 16199/1976, and a method which comprises using AlN and one or more, as a catalyst, selected from the group consisting of elements in groups Ib, IIb, IVa, Va, VIa, VIIa and VIII of the periodic table and silicon, and sintering it under a condition of a high-pressure and high-temperature, as disclosed in Japanese Patent Publication No. 17838/1977.

However, the boron nitride sintered bodies containing c-BN as a main constitutional phase prepared according to these methods are both poor in hardness, because the used metallic element is present as a binder component; therefore these sintered bodies are characteristically unsatisfactory when used as tool materials. Further, also in other applications, they are disadvantageously poor in thermal conductivity, chemical stability and the like.

The inventors of this invention have previously suggested a method for preparing the c-BN sintered body in which h-BN containing no metallic catalyst is used as a starting material, with the intention of overcoming the above-mentioned drawbacks [see Japanese Provisional Patent Publication No. 32771/1980 (Japanese Patent Publication No. 34429/1983)]. This method comprises mixing AlN with h-BN which is a starting material, which AlN works as a catalyst in a conversion reaction of h-BN into c-BN; filling a suitable container with the mixture; pouring an organic solvent such as xylene, toluene or ethyl alcohol into the container in order to adjust a content of oxygen in the container to 2% by volume or less; subjecting the material to the atmosphere of an ultra-high pressure and high-temperature, thereby converting the material h-BN into c-BN and simultaneously obtaining a sintered body. According to this method, the used organic solvent will release bonded hydrogen in the ultra-high pressure and high-temperature treatment process. This nascent hydrogen will remove harmful oxygen which is physically and chemically present in the starting material h-BN, in order to permit completely converting h-BN into c-BN with the aid of the catalytic action of AlN and simultaneously forming the desired sintered body in which the c-BN components are combined with each other.

However, the inventors of this invention have found from additional deep researches that the sintered body prepared according to the above-mentioned method has the following drawbacks. That is, an organic solvent such as xylene or toluene will behave as described above to eliminate deleterious oxygen present in the starting material BN and will contribute to the conversion of the BN into c-BN and the formation of the sintered body, but the solvent will leave free carbon as a residue which will prevent the c-BN components from combining with each other, with the result that the sintered body will be poor in strength.

SUMMARY OF THE INVENTION

An object of this invention is to provide a method for preparing a c-BN-containing sintered body, which is simple, remarkably efficient and economical.

Another object of this invention is to provide a method for preparing cubic boron nidride, which permits accomplishing the formation of the cubic boron nitride at a higher conversion and under easier synthetic conditions as compared with conventional techniques.

That is, the method for preparing the sintered body containing cubic boron nitride according to this invention comprises the steps of contacting a starting material containing boron nitride and/or a starting material containing at least one selected from the group consisting of metals of groups IVb, Vb, and VIb of the periodic table, silicon, aluminum, iron group metals and compounds of the aforesaid metals with at least one selected from the group consisting of borazine, a borazine derivative and a compound composed of boron, nitrogen and hydrogen as will release hydrogen by a thermal decomposition under pressure to form boron nitride; and sintering the material under conditions of a predetermined pressure and temperature under which cubic boron nitride is kept stable.

Further, the method for preparing cubic boron nitride according to this invention comprises the steps of contacting a starting material containing boron nitride and/or a starting material containing at least one selected from the group consisting of metals of groups IVb, Vb, and VIb of the periodic table, silicon, aluminum, iron group metals and compounds of the aforesaid metals with at least one selected from the group consisting of borazine, a borazine derivative and a compound composed of boron, nitrogen and hydrogen as will release hydrogen by a thermal decomposition under pressure to form boron nitride; sintering the material under conditions of a predetermined pressure and temperature under which cubic boron nitride is kept stable; and recovering cubic boron nitride from the obtained sintered body by a chemical and/or physical manner.

DESCRIPTION OF THE PREFERRED EMBODIMENTS

Figure 1:
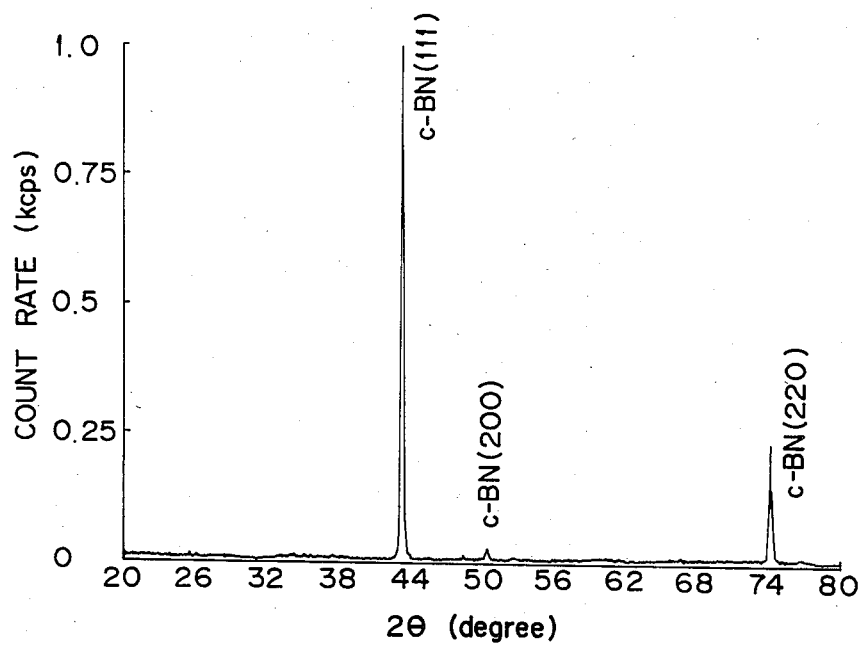
FIG. 1 shows a X-ray diffraction profile of the sintered body in Example 1 prepared by the method of the present invention.

This invention will be explained in detail as follows:

In the method for preparing sintered body containing cubic boron nitride of this invention, a material containing at least boron nitride and/or a material containing at least one selected from the group consisting of metals of groups IVb, Vb, and VIb of the periodic table, silicon, aluminum, iron group metals and compounds of the aforesaid metals are used as the starting material.

In this invention, the starting material containing boron nitride means the starting material consisting of boron nitride or the starting material consisting essentially of boron nitride and at least one selected from the group consisting of various metals and various metal compounds, and preferable example thereof are those shown in Examples 1 to 6 below. Examples of the boron nitride used as the starting material may include amorphous boron nitride, hexagonal boron nitride, wurtzite boron nitride, rhombohedral boron nitride and cubic boron nitride, and at least one selected from the aforesaid boron nitrides is employed for this invention.

Further, the starting material containing at least one selected from the group consisting of metals of groups IVa, Va and VIa of the periodic table, silicon, aluminum, iron group metals, alumina and compounds of the aforesaid metals used in this invention means the starting material consisting at least one selected from the group consisting of metals of groups IVa, Va and VIa of the periodic table, silicon, aluminum, iron group metals and compounds of the aforesaid metals or the starting materials consisting essentially of at least one selected from the group consisting of metals of groups IVb, Vb, and VIb of the periodic table, silicon, aluminum, iron group metals and compounds of the aforesaid metals and at least one selected from the group consisting of various metals and various metal compounds, and preferable example thereof are those shown in Example 7 below. Examples of these metals of groups IVa, Va and VIa of the periodic table, silicon, aluminum, iron group metals and compounds of the aforesaid metals may include metals of group IVb of the periodic table such as Ti, Zr and Hf; metals of group Vb of the periodic table such as V, Nb and Ta; metals of group VIb of the periodic table such as Cr, Mo and W; Si; Al; iron group metals such as Fe, Co and Ni; alloys of these metals such as Ni-Al alloy, Ni-Cr alloy, Ni-Si alloy, Ni-Mo alloy, Ni-Ti alloy, Al-Si alloy, Al-Ti alloy, Co-based heat resistant alloy and Ni-based heat resistant alloy; intermetallic compounds containing these metals such as TiAl, TiAl$_3$, ZrAl$_3$, NbAl$_3$, TaAl$_3$, Mo$_3$Al, CoAl, NiAl, Fe$_3$Al, Fe$_2$Ti, NiTi$_2$, NiTi, Ni$_3$(Al,Ti), Ni$_3$Ti, Co$_2$Ti and Ni$_3$Al; compounds of these metals such as TiC, ZrC, HfC, VC, NbC, TaC, Cr$_3$C$_2$, Mo$_2$C, WC, SiC, TiN, ZrN, HfN, VN, NbN, TaN, AlN, Si$_3$N$_4$, TiB$_2$, ZrB$_2$, TaB$_2$, WB, AlB$_{12}$, Al$_2$O$_3$, TiCN, (Ti,Ta)C, (Ti,-Ta)CN, (Ti,W)C, (T,W)CN, (Ti,Ta,W)C and (Ti,-Ta,W)CN; and the like, and they are used alone or in combination with the above boron nitride.

In this invention, borazine, a borazine derivative and a compound composed of boron, nitrogen and hydrogen as will release hydrogen by a thermal decomposition under pressure to form boron nitride (hereinafter referred to as "borazine and the like") with which the starting materials are contacted are main components converted into c-BN. Borazine used in this invention is a compound having the following formula:

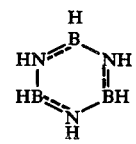

Further, borazine derivatives or a compound composed of boron, nitrogen and hydrogen as will release hydrogen by a thermal decomposition under pressure to form boron nitride used in this invention include a compound having a chemical formula:

wherein x, y and z each represent an integer, and having a ratio of B-H/B-N streching vibrations of the infrared spectrum by pyrolyzing them within the range of 0.1 to 0.7.

Examples of the borazine derivatives include borazonaphthalene represented by the following formula:

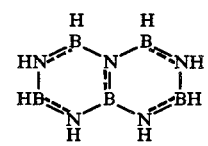

borazobiphenyl represented by the following formula:

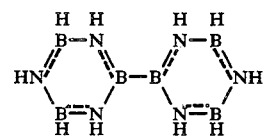

and 2,4-diaminoborazine represented by the following formula:

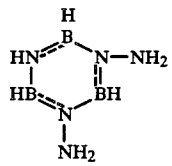

and a compound composed of boron, nitrogen and hydrogen as will release hydrogen by a thermal decomposition under pressure to form boron nitride may include mixtures of boranes such as diborane ($B_2H_6$), tetraborane ($B_4H_{10}$), pentaborane-9 ($B_5H_9$) and decaborane ($B_{10}H_{14}$) with ammonia ($NH_3$) and the like.

In this invention, the aforesaid starting materials are filled in a container and contacted with borazine and the like. In this invention, contacting procedure is carried out, when the contacting material is liquid such as borazine, 2,4-diaminoborazine, by wetting or dipping a compact body comprising the starting material with or into borazine and the like to expel an air from voids of the compact body. The starting material with which a high-pressure container will be filled is prepared by blending and mixing constituent powders, but at this time, the material may be wetted with liquid borazine and the like, in other words, a so-called wet mixing may be carried out, prior to the filling. Further, when a gaseous material such as a mixture of a gaseous borane and a gaseous ammonia is used, it is carried out by introducing the gaseous borane and ammonia into viods of the compact body comprising the starting material in order to expel an air from the voids thereof. Moreover, solid materials such as borane, e.g. decaborane ($B_{10}H_{14}$), borazonaphthaline, borazobiphenyl and the compound having B-H/B-N ratio of infrared spectrum with in the range of 0.1 to 0.7 are used, the contacting procedure is carried out by mixing these materials and the starting materials to form a compact body and then introducing ammonia gas, nitrogen gas or inert gas into voids of the compact body to expel an air from the viods thereof. At this time, the amount of borazine and the like added to the starting material depends upon the extent of voids in the starting material, and it is preferable that borazine and the like is added to the starting material in such an amount so as to expel an air from voids of mixed powder comprising the starting materials and to keep up an amount of oxygen in the container filled with the mixed powder at a level of 2% by volume or less. In view of handling, liquid compound such as borazine and 2,4-diaminoborazine is more preferable.

In the method of this invention, sintering of the material is then carried out under the conditions of a predetermined pressure and temperature under which cubic boron nitride is kept thermodynamically stable. The conditions of the predetermined pressure and temperature under which cubic boron nitride is kept stable of this invention are preferably at a pressure of 4.5 gigapascal (GPa) or more and a temperature of 700° C. or more, and more preferably at a pressure of 6 GPa or more and a temperature of 1400° C. or more. Further, a treatment period of time in this case not particularly limited, but it is generally 1 minute or more, preferably 20 to 30 minutes. After the sintering, decreasing the pressure and temperature in the container to obtain the sintered body containing the cubic boron nitride. By retaining the conditions of the predetermined pressure and temperature for a suitable period of time in compliance with the selected pressure and temperature, a tough sintered body containing c-BN can be formed by converting BN of the starting material and BN produced from borazine and the like by a thermal decomposition into said c-BN simultaneously.

The reason why the conditions are set in the range as mentioned above is that if the conditions other than the above, a sintered body having high toughness could not be obtained.

Next, the method for preparing cubic boron nitride of the present invention will be explained below.

In the manufacturing method of the cubic boron nitride of this invention, at first a sintered body is produced in the same manner as in the method of the aforesaid sintered body containing cubic boron nitride. Then, recovering cubic boron nitride from the sintered body by a chemical and/or physical manner.

As the method for recovering cubic boron nitride from the obtained sintered body, there is, for example, a method which comprises the steps of dipping the sintered body containing cubic boron nitride into a solution such as an acid, an alkaline or the like, and heating, if necessary, to dissolve and remove the material other than the cubic boron nitride. The residue thus treated to dissolve and remove the catalyst and the like is further repeated a washing and drying treatment by using water, an organic solvent or the like, to obtain cubic boron nitride having less impurities.

More specifically, for example, when the aluminum nitride is used as the catalyst, the aluminum nitride can be removed by dipping the sintered body into a caustic alkali solution of NaOH, KOH or the like at 200° to 400° C., or into a boiling aqueous strong caustic alkali solution such as NaOH. Further, for example, when hexagonal boron nitride or amorphous boron nitride is remaining in the sintered body because of low conversion rate into cubic boron nitride, the hexagonal boron nitride or the amorphous boron nitride can be removed physically by use of the difference of specific gravity between the cubic boron nitride and the hexagonal boron nitride. In this method for preparing the c-BN, of these preparative method of the sintered body containing c-BN, the catalyst contained in the sintered body can easily be removed by setting the sintering temperature as low as possible such a range of 700° C. to 1600° C.

According to this invention, the sintered body containing cubic boron nitride which has excellent properties and contains less oxygen, and the cubic boron nitride can be prepared by a simple manner with extremely high conversion rate to the cubic boron nitride as well as economical advantages.

The reasons why the aforesaid sintered body containing cubic boron nitride and the cubic boron nitride can be obtained are as follows:

A first functional effect is that added borazine and the like fill spaces among the respective grains of the mixed powder which is the starting material, in order to expel air therefrom. As a result, the amount of oxygen in the container filled with the mixed powder is kept up at a level of 2% by volume or less, which fact permits remarkably improving the conversion of BN into c-BN.

A second functional effect is that borazine and the like which are added to fill the spaces will be thermally decomposed in the pressurizing and heating process in order to release hydrogen, and the thus produced nascent hydrogen will serve to remove oxygen physically and chemically obstinately bonded to or absorbed by the material BN, whereby the first effect mentioned above can be further heightened.

A third functional effect is that borazine and the like will be thermally decomposed in the pressurizing and heating process to release hydrogen and will finally leave BN, but the thus left BN is most suitable for the c-BN synthesis because of being extremely high in purity and relatively low in crystallinity. That is, according to the investigation by the present inventors, an activating energy necessary to convert a commercially available BN having a high crystallinity into c-BN was 40 to 60 Kcal/mol in the presence of AlN; but a similar energy necessary to convert, into c-BN, amorphous BN having a high purity and low crystallinity which was prepared from borazine and the like through the thermal decomposition under pressure was about 20 Kcal/mol likewise in the presence of AlN. Therefore, it is apparent that the BN material having a high purity and low crystallinity can be converted into c-BN in an outstandingly high proportion.

In this invention, it is definite that added borazine and the like which are the most important characteristic feature of this invention behave as described above, and effects based on such a behavior will also be clear. This point will be further described in detail.

Borazine and the like are used by the method such as wet mixing and the like as described above. In a conventional method, mixing is carried out on a dry system and the resulting mixed powder is then treated to form a green compact, and the high-pressure container is afterward filled with the green compact. In this invention, however, when the wet mixing is performed by the use of borazine and the like, the process of forming the green compact can be omitted, and the high-pressure container can directly be charged with the wetted mixed powder.

In the case that the dry mixing is carried out and a molding press is used to form the green compact similarly to the conventional manner, an apparent density of the green compact can be suitably adjusted by selecting an optional molding pressure. Conversely a porosity of the green compact can be suitably adjusted in such a way. Therefore, in the case that the high-pressure container is filled with the green compact and that borazine and the like are poured thereinto, an amount of borazine and the like to be poured thereinto will be determined from the porosity of the green compact. When poured into the container, borazine and the like can thoroughly fill spaces among grains constituting the green compact, which fact means that the high-pressure container can be charged with the starting material as well as borazine and the like substantially in a density of 100%. This will lead to not only the effect of expelling air from the spaces among the constituent grains but also the establishment of a pressure state very close to the hydrostatic pressure in the high-pressure container in the course of the sintered body formation. It is thus fair to say that such conditions are ideal to convert BN into c-BN and to form the sintered body.

Further, borazine and the like which continuously fill the spaces among the constituent grains can release hydrogen and are thermally decomposed in the sintering process, and the resulting nascent hydrogen serves to deterge the grains in the high-pressure container. The BN material which is left as a result of the thermal decomposition is continuously distributed among the constituent grains of the starting material, and is converted into c-BN together with BN contained in the starting material to form successive three-dimensional net structure.

When the starting material contains a hard compound such as WC or TiC, the hard compound will be sintered at an ultra-high pressure and high-temperature while plastically deformed, and will often form the successive three-dimensional net structure. Therefore, the above-mentioned net structure of c-BN is actually interwined into that of the hard compound, so that the extremely tough cubic boron nitride sintered body will be formed.

In the case that an amount of c-BN is relatively small and that of the hard compound is thus relatively great, the net structure of c-BN will naturally be incomplete at times, but in this case, since the net structure of the hard material is complete, the sintered body can maintain a certain strength as a whole. In the converse case, the net structure of c-BN will be developed, and the sintered body can similarly maintain the total strength at a certain level.

This invention will be further described in detail in reference to several examples as follows:

EXAMPLE 1

A zirconium capsule having an inner diameter of 11 mm was charged with 550 mg of an h-BN powder starting material having a low crystallinity, and the capsule, while opened, was inserted into a force piston and a pressure of 1 ton/cm$^2$ was applied thereto in order to form a green compact of the h-BN powder. According to results of measurement, a porosity of the formed green compact was 34% by volume.

Borazine (0.16 g) was dropwise added to the green compact received in the capsule by the use of an injector in a nitrogen atmosphere. After borazine sufficiently penetrated through the green compact, the capsule was sealed and set in a girdle type high-temperature and high-pressure was caused to increase up to 7 GPa in 18 minutes and a temperature was afterward caused to rise up to 1700° C. in 10 minutes. This condition was maintained for 30 minutes, and the temperature was then dropped, and the pressure was afterward decreased in order to prepare sample 1 of this invention.

COMPARATIVE EXAMPLE 1

The above-mentioned procedure was repeated except that the step of dropwise adding borazine was omitted, in order to prepare sample 1 for comparison.

The procedure of preparing sample 1 of this invention was repeated except that borazine was replaced with xylene, in order to prepare sample 2 for comparison.

Figure 2:
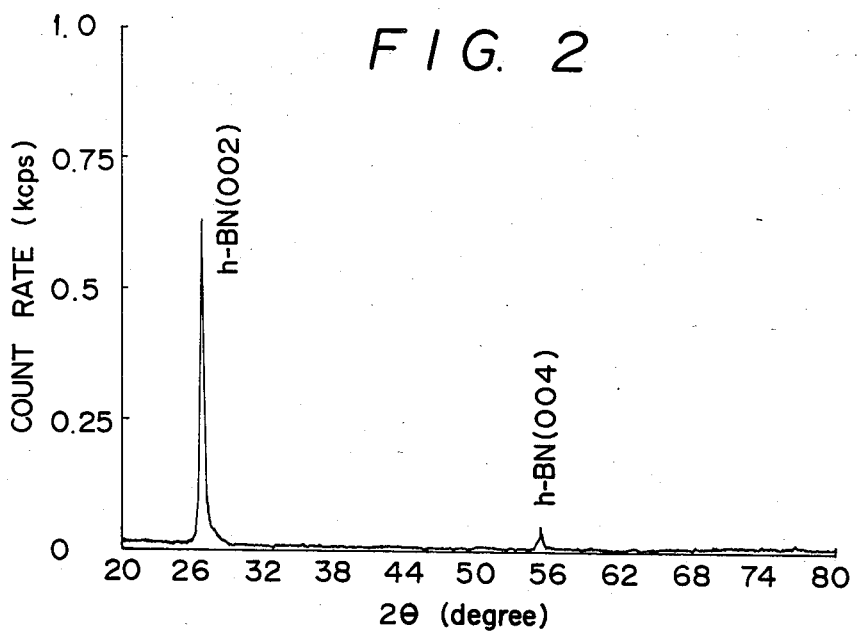
FIG. 2 shows a X-ray diffraction profile of the comparative sample.

According to investigations with the aid of an X-ray diffractometry, as shown in FIG. 1, in sample 1 of this invention a sharp diffraction peak due to c-BN appeared. On the other hand, in samples 1 and 2 for comparison, any existance of c-BN was not observed as shown in FIG. 2. It was confirmed by an optical microscope that sample 1 of this invention comprised a polycrystalline sintered body having a grain diameter of 1 to 3 μm.

EXAMPLE 2

A mixed powder comprising 60% by volume of c-BN having a low crystallinity, 25% by volume of TiC and 15% by volume of TiN was prepared as a starting material in an amount of 550 mg, and a stainless steel capsule was charged with the mixed powder. A pressure of 1 ton/cm$^2$ was then applied to the opened capsule in order to form a green compact of the mixed powder. Borazine (0.11 g) was poured into the green compact received in the capsule by the use of an injector. After borazine sufficiently penetrated through the green compact, the capsule was sealed and set in a girdle type high-temperature and high-pressure device having a carbon heater therein. A pressure was caused to increase up to 7 GPa in 18 minutes and a temperature was afterward caused to rise up to 1700° C. in 10 minutes. This condition was maintained for 30 minutes, and the temperature was then dropped, and the pressure was afterward decreased in order to prepare sample 2 of this invention.

The procedure of preparing sample 2 of this invention was repeated except that borazine replaced with a borazine derivative, 0.15 g of 2,4-diaminoborazine ($B_3N_5H_8$), in order to prepare sample 3 of this invention.

COMPARATIVE EXAMPLE 2

The procedure of preparing sample 2 of this invention was repeated except that borazine was replaced with toluene, in order to prepare sample 3 for comparison.

According to investigations with the aid of an X-ray diffractometry, in samples 2 and 3 of this invention, sharp diffraction peaks of c-BN were observed and no diffraction peak of h-BN was observed. By contrast, in sample 3 sharp diffraction peaks of h-BN were observed and observed diffraction peaks of c-BN were very weak compared to those of the samples 2 and 3.

According to detailed investigations on samples 2 and 3 of this invention with the aid of a microscope, it was found that c-BN comprised a polycrystalline substance having a grain diameter of 2 to 5 μm and had steric net structure mutually interwining into a hard compound phase composed of TiC, TiN and their solid solutions. Samples 2 and 3 of this invention had Vickers hardnesses of 3300 and 3230 kgf/mm, respectively, at a temperature of 600° C.

EXAMPLE 3

A mixed powder comprising 60% by volume of h-BN having a low crystallinity, 25% by volume of TiC and 15% by volume of AlN was prepared as a starting material in an amount of 550 mg, and a stainless steel capsule was charged with the mixed powder. A pressure of 1 ton/cm² was then applied to the opened capsule in order to form a green compact of the mixed powder. Borazine (0.12 g) was poured into the green compact received in the capsule by the use of an injector. After borazine sufficiently penetrated through the green compact, the capsule was sealed and set in a girdle type high-temperature and high-pressure apparatus having a carbon heater therein. A pressure was caused to increase up to 7 GPa in 18 minutes and a temperature was afterward caused to rise up to 1650° C. in 10 minutes. This condition was maintained for 30 minites, and the temperature was then dropped, and the pressure was afterward decreased in order to prepare sample 4 of this invention.

COMPARATIVE EXAMPLE 3

The procedure of preparing sample 4 of this invention was repeated except that borazine was replaced with benzene, in order to prepare sample 4 for comparison.

According to the results of tests by virture of an X-ray diffractometry, in sample 4 of this invention and sample 4 for comparison, substantially similar sharp diffraction peaks of c-BN were observed, but any diffraction peak of h-BN was not observed. Sample 4 of this invention and sample 4 for comparison had Vickers hardnesses of 3200 and 3080 kgf/mm, respectively, at a temperature of 600° C.

Moreover, knife edge tips for a turning tool were made from both the samples, and these tips were subjected to a discontinuous cutting test against an SCM3 carburizing hardened steel (surface hardness HRC62). As conditions of the cutting test, a diameter of the material to be cut was 250 mm, the used turning tool was of a 2-slot type, a cutting speed was 100 m/min, a cutting depth was 0.25 mm, a feed of the tip was 0.15 mm/rev, and a cutting atmosphere was dry. Periods of time taken until a chipping occurred on the knife edge were measured and compared to seek for chipping-resistant values of both the samples. The results indicate that in sample 4 of this invention, no chipping appeared even after 12 minutes' cutting, but in sample 4 for comparison, a broken embankment-shaped chipping occurred in 6 minutes. It was confirmed from detailed investigations by the present inventors that in sample 4 for comparison, non-diamond carbon is present on boundaries between crystals of c-BN and the constituent compounds, with the result that the strength of the whole structure was impaired.

EXAMPLE 4

A mixed powder comprising 80% by volume of h-BN having a low crystallinity, 10% by volume of WC and 10% by volume of Co was prepared as a starting material in an amount of 550 mg. The mixed powder was placed in an agate mortar, and about 0.25 cc of borazine was promptly added thereto while the mixed powder was stirred and mixed in a nitrogen atmosphere, in order to form a slurry of the mixed powder. A zirconium capsule was then charged with the slurry and was sealed, and the procedure of Example 1 was repeated to prepare a strong cubic boron nitride sintered body (sample 4).

EXAMPLE 5

As a starting material, 550 mg of a c-BN powder were previously prepared, and a zirconium capsule was filled with the c-BN powder. A pressure of 1 ton/cm² was applied thereto in order to form a c-BN green compact in the capsule. It was supposed that its porosity was about 34% from an apparent density of the c-BN green compact. Borazine (0.11 g) was poured into the green compact in a nitrogen atmosphere, and after its penetration, the capsule was sealed and set in a girdle type high-temperature and high-pressure apparatus having a carbon heater therein. A pressure was caused to increase up to 7 GPa in 15 minutes and a temperature was afterward caused to rise up to 1700° C. in 10 minutes. This condition was maintained for 30 minutes, and the temperature was then dropped and a pressure was afterward decreased in order to prepare sample 5 of this invention.

Sample 5 of this invention was a semitransparent white strong sintered body, whereas sample 5 for comparison was not strong and was easily broken by a plastic hammer.

EXAMPLE 6

Borazine sealed in a gold capsule was pyrolyzed in a pyrolyzing apparatus at a pressure of 100 MPa, a temperature of 300° C. and a holding time of an hour to prepare white powder. According to investigations with the aid of an X-ray diffractometry and infrared absorption spectrometry in the white powder, it is confirmed that the white powder is a borazine derivative having B-H/B-N infrared spectrum ratio of 0.6. After molding a mixed powder comprising 30% by volume of the borazine derivative obtained above, 40% by volume of h-BN having a low crystallinity and 30% by volume of ZrN, the resultant green compact was directly charged in an apparatus having a carbon heater under $N_2$ gas stream. Subsequently, the apparatus having a carbon heater was placed in a high pressure apparatus and retained at a pressure of 6.5 GPa and a temperature of 1700° C. for an hour, and then the temperature was dropped and the pressure was afterward decreased in order to prepare sample 6 of this invention.

COMPARATIVE EXAMPLE 4

The procedure of preparing sample 6 of this invention was repeated except that a mixed powder comprising 70% by volume of h-BN and 30% by volume of ZrN was used as a starting material, to prepare a sintered body of sample 6 for comparison.

According to investigations with the aid of an X-ray diffractometry, in sample 6 of this invention a sharp diffraction peak of c-BN was observed and a diffraction peak of h-BN was not observed. However, in sample 6 for comparison, a diffraction peak of h-BN was observed but any diffraction peak of c-BN scarcely appeared. Further, sample 6 of this invention had Vickers hardnesses of 3300 kgf/mm.

EXAMPLE 7

A zirconium capsule was filled with 1.0 g of a starting material comprising 50% by volume of TiC, 20% by volume of TiN, 20% by volume of WC, 2% by volume of Ni, 1% by volume of Nb and 7% by volume of Al, and a pressure of 660 kgf/mm was applied thereto for a press molding in order to form a green compact having a porosity of 44%. Borazine (1.4 g) was then poured into the green compact, and after its penetration, the capsule was sealed and set in a high-pressure apparatus. A pressure was caused to increase up to 6.5 GPa and a temperature was afterward caused to rise up to 700° C. This condition was maintained for 10 minutes, and the temperature was then elevated up to 1400° C. This high temperature was retained for 20 minutes. After the decrease in the temperature and pressure, sample 7 of this invention was prepared.

According to an X-ray diffraction test, in sample 7 of this invention, a sharp diffraction peak of c-BN was observed, which fact indicated that borazine poured in the process released hydrogen by the high-pressure and high-temperature treatment and was converted into c-BN.

From observation of sample 7 of this invention by means of a microscope, it was confirmed that the convertedly synthesized c-BN substance was intertwined into a TiC-TiN-WC-Ni-Nb-Al alloy phase and a steric net structure was thus established, thereby forming the tough sintered body as the whole.

A tip for a turning tool was made from sample 7 of this invention, and a discontinuous cutting test was carried out in the same manner as in Example 3. As a result, no chipping occured thereon even after 12 minutes' cutting, which fact testified that sintered body sample 7 of this invention could be employed as a tool material excellent in chipping resistance.

EXAMPLE 8

A mixed powder comprising 500 mg of h-BN having a low crystallinity and 50 mg of AlN was prepared, and in the same manner as in Example 1, a capsule to which 0.18 g of borazine was sufficiently penetrated was sealed and set in a girdle type high-temperature and high-pressure apparatus having a carbon heater therein. A pressure was caused to increase up to 6 GPa and a temperature was afterward caused to rise up to 1450° C. This condition was maintained for 30 minites to prepare a sintered body. This sintered body was dipped into a NaOH solution of which the temperature thereof was 300° C., washed with a distilled water and an alcohol solution repeatedly and then dried to obtain a sample 8 of this invention.

According to the results of test using X-ray diffractometry on sample 8 of this invention, it was confirmed that sharp diffraction peaks of c-BN were observed.

As clearly seen from the above description, according to the method for preparing the sintered body containing cubic boron nitride of this invention, preparation of the sintered body containing cubic boron nitride is simple, high in efficiency and excellent in economy. Further, according to the method for preparing the cubic boron nitride of this invention, the cubic boron nitride can be obtained with high conversion rate as compared with the conventional manner and the method can be effected by more simple conditions.

We claim:

1. A method for preparing a sintered body containing cubic boron nitride which comprises the steps of:

contacting (A) a starting material containing boron nitride and/or a starting material containing at least one selected from the group consisting of metals of groups IVb, Vb and VIb of the periodic table, silicon, aluminum, iron group metals, and compounds selected from the group consisting of carbides, nitrides and borides of the metals of said groups IVb, Vb, and VIb, AlN, AlB$_{12}$, Al$_2$O$_3$, SiC, and Si$_3$N$_4$ with (B) at least one selected from the group consisting of borazine, a borazine derivative and a compound comprised of boron, nitrogen and hydrogen which releases hydrogen by thermal decomposition under pressure to form boron nitride which is converted into cubic boron nitride at a predetermined pressure and temperature; and then sintering the material under predetermined conditions of pressure and temperature at which cubic boron nitride is stable.

2. The method for preparing a sintered body containing cubic boron nitride according to claim 1, wherein said predetermined pressure and temperature are 4.5 GPa or more and 700° C. or more, respectively.

3. The method for preparing a sintered body containing cubic boron nitride according to claim 1, wherein said starting material containing boron nitride is a material containing at least one selected from the group consisting of amorphous boron nitride, hexagonal boron nitride, wurtzite boron nitride, rhombohedral boron nitride and cubic boron nitride.

4. The method for preparing a sintered body containing cubic boron nitride according to claim 1, wherein said at least one selected from the group consisting of borazine, a borazine derivative and a compound composed of boron, nitrogen and hydrogen is at least one selected from the group consisting of borazine, borazonaphthaline, borazobiphenyl and 2,4-diaminoborazine.

5. A method for preparing cubic boron nitride which comprises the steps of:
    contacting (A) a starting material containing boron nitride and/or a starting material containing at least one selected from the group consisting of metals of groups IVb, Vb and VIb of the periodic table, silicon, aluminum, iron group metals, and compounds selected from the group consisting of carbides, nitrides and borides of the metals of said groups IVb, Vb, and VIb, AlN, AlB$_{12}$, Al$_2$O$_3$, SiC, and Si$_3$N$_4$ with (B) at least one selected from the group consisting of borazine, a borazine derivative and a compound comprised of boron, nitrogen and hydrogen which releases hydrogen by thermal decomposition under pressure to form boron nitride which is converted into cubic boron nitride at a predetermined pressure and temperature;
    sintering the material under predetermined conditions of pressure and temperature at which cubic boron nitride is stable; and then
    recovering cubic boron nitride from the obtained sintered body by a chemical and/or physical process.

6. The method for preparing cubic boron nitride according to claim 5, wherein said predetermined pressure and temperature are 4.5 GPa or more and 700° C. or more, respectively.

7. The method for preparing cubic boron nitride according to claim 5, wherein said starting material containing boron nitride is a material containing at least one selected from the group consisting of amorphous boron nitride, hexagonal boron nitride, wurtzite boron nitride, rhombohedral boron nitride and cubic boron nitride.

8. The method for preparing cubic boron nitride according to claim 5, wherein said at least one selected from the group consisting of borazine, a borazine derivative and a compound composed of boron, nitrogen and hydrogen is at least one selected from the group consisting of borazine, borazonaphthaline, borazobiphenyl and 2,4-diaminoborazine.

9. The method for preparing a sintered body containing cubic boron nitride according to claim 1, wherein said starting material is aluminum nitride.

10. The method for preparing cubic boron nitride according to claim 5, wherein said starting material is aluminum nitride.

* * * * *